United States Patent [19]

Murvall

[11] 3,993,267

[45] Nov. 23, 1976

[54] FISHING REELS

[75] Inventor: Åke Eugen Murvall, Svangsta, Sweden

[73] Assignee: ABU Aktiebolag, Svangsta, Sweden

[22] Filed: Sept. 17, 1974

[21] Appl. No.: 506,794

[30] Foreign Application Priority Data

Sept. 24, 1973 Sweden .............................. 7312950

[52] U.S. Cl. ................................................ 242/217
[51] Int. Cl.² ........................................ A01K 89/02
[58] Field of Search ............ 242/99, 217, 218, 219, 242/84.5–84.52; 192/113 A

[56] References Cited
UNITED STATES PATENTS

| | | | |
|---|---|---|---|
| 2,190,786 | 2/1940 | Henz | 242/84.52 R |
| 2,555,183 | 5/1951 | Butler | 192/113 A |
| 3,166,269 | 1/1965 | Veroli | 242/84.5 |
| 3,317,159 | 5/1967 | Morritt | 242/84.52 |

*Primary Examiner*—S. Clement Swisher
*Attorney, Agent, or Firm*—Karl W. Flocks

[57] ABSTRACT

A fishing reel with a sliding clutch, in which the friction material is protected against overheating by streams of cooling air in order to increase its life and safety of function. One of the coupling disks is connected with a fan wheel carried by the spool.

8 Claims, 2 Drawing Figures

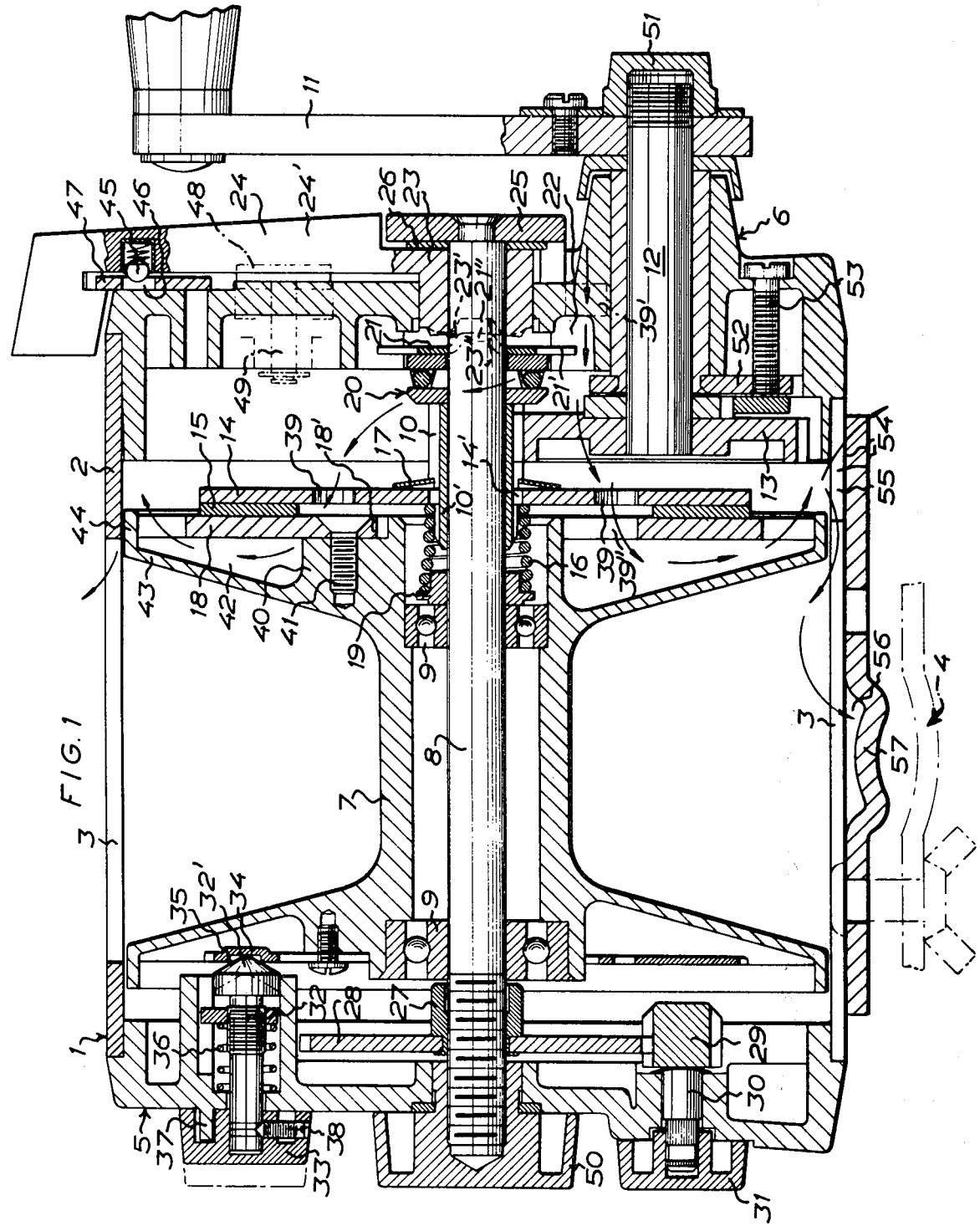

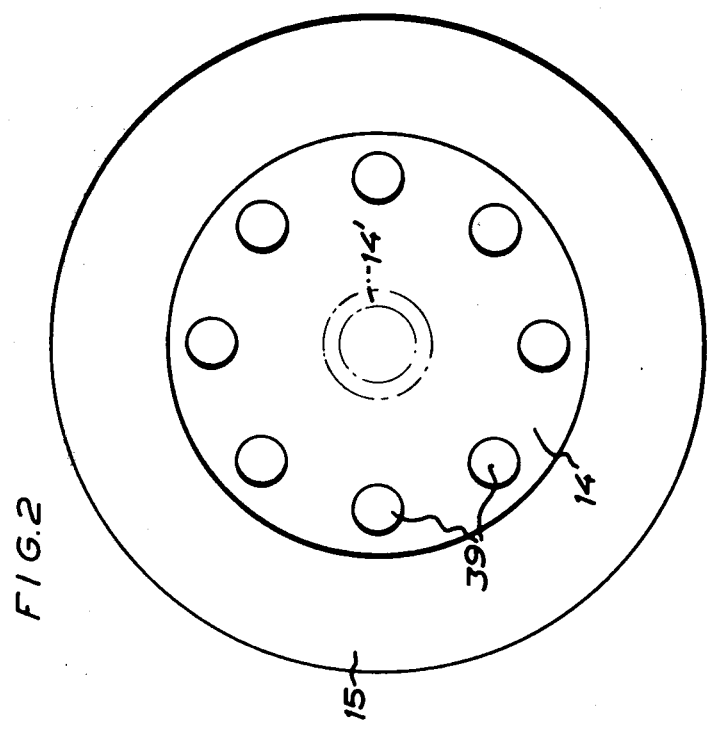

FISHING REELS

The present invention relates to a fishing reel having a casing serving as a support for a spool rotatable by means of a crank and a transmission comprising a sliding clutch arranged between the crank and the spool, said clutch including two coupling disks one of which is adapted to be driven by the crank shaft and the other to be rotated together with the spool, said disks being adapted to be brought together into controllable frictional engagement by a controlling means.

Fishing reels for heavy fishing are, as is well known, provided with some kind of adjustable sliding clutch to permit sliding in the transmission between crank and spool when a certain pull in the line is exceeded. In fishing reels for deep-sea fishing the demands on the sliding clutch between the spool and the crank mechanism are much greater than in smaller sport fishing reels. This is due to the increased depths of fishing, the influence of sea currents upon a very large length of line, heavier baits, bigger fish and a sturdier crank mechanism. When using heavy baits and a large length of line is dispensed in fishing from a motor-boat or fishing vessel the sliding clutch must be able to hold the line but also it must admit the line to be pulled out by the fish having taken the bait. When the fish rushes with great force and at high speed, the friction coupling may be exposed to very strong heating due to the high rotational speed of a friction element connected with the spool and being in a relatively hard frictional engagement with a non-rotating friction element, and this makes very high demands on the sliding clutch construction and on the material in fishing reels for deep-sea fishing.

To enable a more exact control of the braking torque of the sliding clutch and to keep the required application forces between the parts of the sliding clutch within moderate limits also at a maximum braking torque (even locking), the friction surfaces should lie on a comparatively large radial distance from the axis of rotation of the rotary part (long torque axis), but in that case, when sliding with a certain number of revolutions of the spool, the relative speed between the friction surfaces will be higher than in case said surfaces lie on a smaller radial distance from said axis, and, as the heating of the friction surfaces is dependent upon both the speed and pressure between the friction disks, the heating between the friction surfaces can in both cases be important and lead to destruction of the friction material, for instance a cork disk interposed between two coupling disks.

The object of the present invention is to provide the fishing reel with a strong and reliable sliding clutch of comparatively simple design, in which the friction material is efficiently protected against overheating in order to increase its life and safety of function.

This object has been realized with the fishing reel of this invention wherein one of the coupling disks is connected with a fan wheel carried by the spool. Further objects and advantages of the invention will appear from the following description.

The invention will be described in more detail below with reference to the accompanying drawings, in which:

FIG. 1 is an axial sectional view of the fishing reel according to the invention, and FIG. 2 is a plan view of a complete coupling disk mounted, as seen in FIG. 1, on the shaft of the spool and consisting of a support disk and an annular friction or brake lining for cooperation with a coupling disk at one end of the spool.

The fishing reel shown in FIG. 1 includes a casing 1 serving as a frame, consisting of a cylinder-shaped part 2 having a number of openings 3 around its circumference and, at its underside, means 4 for mounting the reel on a support of suitable type, and end walls 5, 6 which are readily detachably connected with the ends of the cylinder-shaped part 1 which may be in the form of a cage. The spool 7 is rotatably mounted on a shaft 8 by means of ball bearings 9 at both ends of the spool. On the shaft 8, which extends out through the end walls 5, 6 of the casing, in a space in the casing between one end of the spool 7 (right-hand end in FIG. 1) and the corresponding end wall 6, there is mounted a gear wheel 10 engaging a gear wheel 13 mounted on the shaft 12 of the crank 11. The gear wheel 10 on the shaft of the spool 8 has an extension 10' which is provided with indentations or teeth for engagement with indentations or teeth 14' on the internal circumference of a circular coupling disk 14 which is readily detachably supported on the gear wheel extension 10' adjacent the right-hand end of the spool. The disk 14 forms a support for an annular friction or brake lining 15 with plane sides, which is attached on the side of the disk 14 facing the spool. The gear wheel 10 is mounted on the spool shaft 8 for movement with and against the action of a load spring 16 and it has sufficiently long teeth to retain its engagement with the gear wheel 13 and with the teeth or indentations 14' at the central bore of ths disk 14. As shown in the drawing, the gear wheel 10 has a shoulder abutting the inner peripheral edge of a spring washer 17 the outer peripheral edge of which abuts the disk 14 which, by means of an arrangement described below, can be displaced via the gear wheel 10 against the action of the spring 16 towards the spool for pressing the braking disk 15 against a coupling disk 18 on the spool. The spring 16 is in the form of a conical helical spring mounted on the spool shaft 8 between the movable coupling disk 14 and a support ring 19 which lies close to one (the right-hand) bearing of the spool. The gear wheel 10 abuts, at its outer (right-hand) end, on an axial ball bearing 20 which is movably mounted on the shaft 8 of the spool and bears with its end remote from the gear wheel against a pressure-transmitting means 21 which is movably mounted on the shaft 8 and is in the form of a ring which, by means of two diametrically positioned fork-shaped projections 21', straddles and is controlled by two diametrically positioned axial guiding fins 22 at the right-hand end wall 6 of the casing. The pressure-transmitting ring 21 has an outwardly bent intermediate portion 21" which bears against the adjacent end 23' of a hub 23 of a coupling or brake control arm 24 which, by means of the hub 23, is mounted on the end of the spool shaft 8 and is retained on the shaft by means of a head 25 which is connected with the shaft end and on which the hub 23 of the arm 24 is borne at its outer end by means of a bearing ring 26.

The arm 24 is rotatable between stop positions determined by abutments between relatively eccentric surfaces on the head 25 and a part 24' of the arm 24 projecting over the head. The end of the arm hub 23 facing the pressure-transmitting ring 21 forms a cam means for displacing the ring 21 and, consequently, the gear wheel 10 and the coupling disk 14 towards the spool against the action of the spring 16. In a certain angular position of the arm 24 the projecting portion 21'' of the ring 21 falls into a transverse depression 23'' in the end 23' of the arm hub and in this position the coupling disk 18 on the spool is disconnected from the coupling disk 14 on the shaft 8 and the spool can freely rotate on the shaft.

The left-hand end portion of the spool shaft 8 is threaded and carries a nut 27 which forms an axially adjusting and locating means for the spool 7 which is movable along the shaft 8 on the inner bearing rings of the bearings 9 and is displaceable against the action of the spring 16 by means of the nut 17 engaging the inner bearing ring of the left-hand spool bearing. This arrangement makes it possible to adjust the distance of the coupling disk 18 on the spool relative to the friction disk 15 on the coupling disk 14. It should be noted that the brake arm 24 in FIG. 1 is shown in a braking position in which the hub end 23' presses the axial bearing 20, the gear wheel 10, the spring washer 17 and the disks 14, 15 in a direction to the left into braking engagement with the disk 18. To permit adjusting the nut 27 from the outside the nut has a gear wheel 28 engaged with a small gear wheel 29 on a shaft 30 which is mounted in the left-hand end wall 5 of the casing 1 and on the outer end of which there is mounted a small hand wheel 31 by means of which the nut 27 can be rotated via the friction force pre-adjusting gear formed by the gear wheels 28, 29.

The spool is also provided with a slide signal device which comprises a spring-biased pin 32 which is movably mounted in the left-hand end wall 5 of the casing for movement with and against the action of the spring load and which can be displaced, through a helical movement produced by means of a wheel 33 on the outer end of the pin, in axial direction from an outer free position to an inner signal position in which the pin is shown by full lines in FIG. 1 and in which the inner, ball-shaped or rounded-off conical end 32' of the pin rests against a signal ring 34 which is mounted on the left-hand end wall of the spool and provided with an annular row of circular recesses 35. The load spring 36 of the pin 32, which is clamped between abutment surfaces on the pin and on the end wall 5, tends to push the pin inwardly into engagement with the signal ring 34 but, through a rotational movement produced by means of the wheel 33, the pin can be pulled rearwardly and be hung up on an end wall projection 37, in which position the pin and the wheel is shown in FIG. 1 by dashed lines. The screw designated 38 is a locking screw by means of which the wheel is connected with the outer end of the pin. In the signal position of the pin 32, in which position the pin is shown by full lines, the end 32' of the pin falls into the recesses 35 in the signal ring 34 as a result of the rotation of the spool 7 (when the line is wound by means of the crank 11 or when sliding), and produces thereby a signal of a character varying in dependence on the rotational speed of the spool.

In the construction according to this invention the right-hand end wall of the spool 7 forms, as a result of a special arrangement of the coupling disk 18 mounted on this end wall, a fan wheel for cooling the clutch when sliding. For this purpose the right-hand end wall (like the left-hand end wall) of the spool has an annular hub portion 40, on which the coupling disk 18 is mounted by means of screws 41, and a number of radial vanes 42, the axial end surfaces of which form, together with the end surface of the annular portion 40, supporting surfaces for the coupling disk 18 whose outer diameter is substantially smaller than the outer ring-shaped portion 44 of the spool end wall 43. The coupling disk 18 comprises an outer annular portion and radially inwardly directed arms 18' which form mounting arms for connecting the coupling disk 18 on the annular hub portion 40 by means of the screws 41. Between the spoke-like parts 18' of the coupling disk 18 and the vanes 42 on the end wall 43 of the spool there are formed air flow channels which, through a central cavity in the friction disk 15 and a number of ventilation ports 39 in the coupling disk 14, communicate with the space between the coupling disk 14 and the right-hand end wall 6 of the casing. Air flow passages are arranged in the form of holes 39' in the right-hand end wall 6 and slots between the spool 7 and the cylinder-shaped casing wall 2 for flow of air along the paths indicated by arrows in FIG. 1.

To adjust the brake arm 24 in determined braking torque positions or in a fully disconnected position the brake arm carries a spring-biased ball 45 for cooperation with a number of dwelling holes or recesses 46 which are arranged in a circularly bow-shaped row on the outside of the right-hand end wall 6 or in a rail 47 mounted thereon. At the right-hand end wall 6 a spring-biased push-button 48 serving as an abutment for the brake control arm 24 is supported on a pin 49 which is mounted in a bore in the end wall and is displaceable within limits of two abutments. The push-button 48 is positioned at that end of the row 46 of dwelling holes in which the brake control arm 24 may be moved to increase the braking torque to a value pre-adjusted by the hand wheel 31. If the fisherman during fishing suddenly would desire a braking torque higher than this pre-adjusted value, he pushes the push-button 48 to permit the arm 24 to pass the push-button 48 and to move to a position for exerting a higher braking force. It should be noted that the button 48 with the pin 49 is mounted in that half of the end wall 6 which is not included in the sectional view of FIG. 1 and it therefore is merely indicated by dashed lines.

In the construction shown in the drawings the friction disk 15 consists of cork material, which has several properties suitable for the purpose here intended, and is glued onto the coupling disk 14 serving as a support, by means of a suitable heat resisting resin glue. The coupling disk 18 consists of metal of high thermal conductivity for efficient cooling of the friction surface. Brass is preferably used as a material for the spool 7. Brass has good heat conducting properties and it would therefore appear natural to use the same material for the coupling disk 18 but, nevertheless, brass has been found less suitable.

When sliding occurs in conventional sliding clutches of deep-sea fishing reels, it has been found that the temperature in the zone of the friction surfaces can rise to about 150° C. At this temperature a friction disk consisting of cork will be subjected to burns due to friction against the disk 18. If the disk consists of brass, copper will be deposited, due to the frictional heat, on the cork disk, whereby the braking torque decreases successively at a certain braking pressure. The cork disk which is oiled before mounting in order to offer higher resistance to water, will thus become dry and brittle through the heating due to friction and will also have inferior frictional properties because it is coated with metal. These problems cannot be avoided by nickel-plating a braking disk 18 of brass. Also in this case there will be black burns on the cork disk and copper will deposit through the nickel layer. This proves that some other metal than brass must be chosen but most metals are unsuitable either due to insufficient thermal conductivity, unsatisfactory frictional properties or due to the price being too high. Considering the less suitable properties of brass, one would not expect copper to give a better result but quite surprisingly it has been found that copper does not deposit on the cork disk at the maximum temperatures from a nickel-plated copper disk or an all-copper disk. A coupling disk 18 of copper has a very high thermal conductivity, it is comparatively cheap and spares the cork disk either the friction surface itself consists of copper or it is nickel-plated. Due to the excellent heat conducting properties in combination with the efficient cooling in the sliding clutch according to the invention, it has been found possible to reduce the maximum heating due to friction by about ¼, for instance from about 150° C to about 110° C, which means that, without any remarkable complications of construction or rise in price, the vital part that the sliding clutch constitutes in especially fishing reels intended for deep-sea fishing, will have a considerably longer life and operate with more safety of function than previously known sliding clutches. As deposition of metal on the friction disk 15 (of cork, fibre material or some other suitable friction material) is avoided, there is no risk that the slide brake would suddenly cease to function at critical moments during the hauling in of a big fish.

The shown arrangement described above (brake arm 24, hub 23 with cam means 23', pressure transmitting ring 21, axial ball bearing 20, gear wheel 10 and cup-shaped washer 17) may of course be modified in many ways within the scope of the invention. However, the arrangement shown has the advantage that it makes use of means (an axial bearing 20 and a gear wheel 10) which a fishing reel of this type has or should be equipped with. The arrangement shown has also the advantage of being readily disassembled. After loosening a nut 50 at the end of the left-hand threaded end portion of the shaft 8, the right-hand end wall 6 including the crank 11 and the brake arm 24 and the spool 7 can be pulled out from the remaining portion (wall 3 and end wall 5) of the casing and after loosening the nut 27 which supports the gear wheel 28, the spool 7 can be pulled out from the shaft 8. Most parts of the inner mechanism will then be accessible to inspection and maintenance. The crank 11 may be removed by loosening a nut 51, whereupon the gear wheel 13 and an anti-reverse arm 52 can be dismounted.

According to the preferred embodiment shown in FIG. 1, the fan wheel 40, 42, 43, 44 sucks cooling air, as indicated by arrows, through the apertures 39', which are arranged in the end wall 6 of the casing radially outwardly of the spool shaft 8, into the space between the end wall 6 and the coupling disk 14, and therefrom through the ports 39 in the coupling disk 14 and the central opening 39'' in the coupling disk 18 to the radial channels between the vanes 42 of the spool end wall/fan wheel, and in these channels the cooling air flows as a plurality of separate air streams in radial outward directions in contact with the coupling disk 18 for efficiently leading off heat therefrom. The cooling air passes out through the peripheral openings 3 of the casing and other openings, such as an axial guide slot 54 in the end of the wall 2 for a guiding means 55 on the end wall 6 of the casing, and through an opening 56 disposed between the wall 2 of the casing and an attachment 57 for the mounting means 4 of the fishing reel. It should be stressed, however, that these air flow paths may be modified by changing the air passage openings.

In addition to the modifications indicated above concerning the sliding clutch and its adjusting means, several other modifications are of course feasible within the scope of the invention.

What I claim and desire to secure by Letters Patent is:

1. A fishing reel comprising means serving as a support for a rotatably mounted spool having radially protruding end walls, a rotatable fan wheel having substantially radial vanes and air flow channels therebetween, a crank and a transmission for rotating said spool, said transmission comprising a sliding clutch arranged between said crank and said spool and including control means and first and second coupling disks, said first coupling disk being mounted to be rotated together with said spool and said second coupling disk being mounted to be driven by said crank shaft and said first and second disks being relatively movably mounted to be brought together into controllable frictional engagement by said control means, wherein said first coupling disk is supported by said rotatable fan and forms together with said radial vanes and said channels open ended, substantially radially extending flow passages, said first coupling disk having air inlet means in communication with the radially inner ends of said open ended flow passages and said fan wheel with said first coupling disk being supported by one of said spool end walls between said spool and said second coupling disk for sucking air through said air inlet means of said first coupling disk and throwing air outwardly in said flow passages between said vanes in cooling contact with the side of said first coupling disk facing said fan wheel.

2. A fishing reel as claimed in claim 1, in which said means serving as a support comprises an end casing enclosing said sliding clutch, wherein said one end wall of said spool and said fan wheel are formed in one integral piece and said vanes of said fan wheel are in the form of substantially radial ribs serving as stiffening means, said first coupling disk being mounted on said ribs to define with said ribs and the adjacent spool end wall said radial open ended air flow passages, said casing having openings and said coupling disks having ports permitting air to circulate from the outside of said casing to said coupling disks and via said ports to said fan wheel and through said open ended flow passages and out of said casing.

3. A fishing reel as claimed in claim 1, wherein said first coupling disk has a plurality of ventilation ports at a radial distance inwardly of the outer edge of said disk and supports, on an annular surface facing the other of said coupling disks, and disposed radially outwardly of said ventilation ports, an annular brake disk fixedly connected to said annular surface, and said second coupling disk has an annular friction surface for cooperation with said brake disk and at least one opening disposed radially inwardly of said annular friction surface and in communication with said ventilation ports in said first coupling disk and permitting introducing of air to said open ended flow passages.

4. A fishing reel as claimed in claim 1, wherein one of said coupling disks is a disk consisting of copper and wherein a disk of friction-increasing material interposed between said coupling disks is fixedly connected, at least with respect to rotation, with the other of said coupling disks.

5. A fishing reel as claimed in claim 4, wherein said copper disk is nickel-plated.

6. A fishing reel as claimed in claim 4, wherein said one coupling disk is said first coupling disk which is mounted on said fan wheel.

7. A fishing reel as claimed in claim 1, wherein said spool end wall and said fan wheel are integrally cast of brass.

8. A fishing reel as claimed in claim 1, wherein said spool and said fan wheel are integrally cast of a metal based on copper.

* * * * *